United States Patent

[11] 3,614,383

| [72] | Inventor | Ridley Watts, Jr.<br>Cleveland, Ohio |
|---|---|---|
| [21] | Appl. No. | 869,420 |
| [22] | Filed | Aug. 15, 1969 |
| [45] | Patented | Oct. 19, 1971 |
| [73] | Assignee | The American Packaging Corporation<br>Hudson, Ohio |

[54] IMPULSE HEATING DEVICE FOR USE WITH THERMOPLASTIC MATERIALS AND METHOD
14 Claims, 7 Drawing Figs.

[52] U.S. Cl. .................................................. 219/243, 156/515
[51] Int. Cl. .................................................. H05b 1/00
[50] Field of Search .................................................. 219/243, 388; 156/251, 515, 583; 83/15, 16, 30

[56] References Cited
UNITED STATES PATENTS

| 2,730,161 | 1/1956 | Langer | 156/292 |
| 2,802,086 | 8/1957 | Fener | 219/528 X |
| 3,142,608 | 7/1964 | Techtmann | 219/388 X |
| 3,369,919 | 2/1968 | Inglis | 219/243 X |

Primary Examiner—J. V. Truhe
Assistant Examiner—C. L. Albritton
Attorney—Watts, Hoffmann, Fisher & Heinke ABSTRACT: Apparatus for cutting and/or sealing plastic film, including an impulse-heated cutting device and a pressure pad on opposite sides of the film. The cutting device includes a support frame member and a resistance-heated element formed by a corrugated ribbon. The ribbon is supported in the frame by dielectric material. An edge of the ribbon projects from the frame toward the pressure pad and engages the plastic film for cutting and/or sealing the film when the film is compressed between the pressure pad and the resistance element.

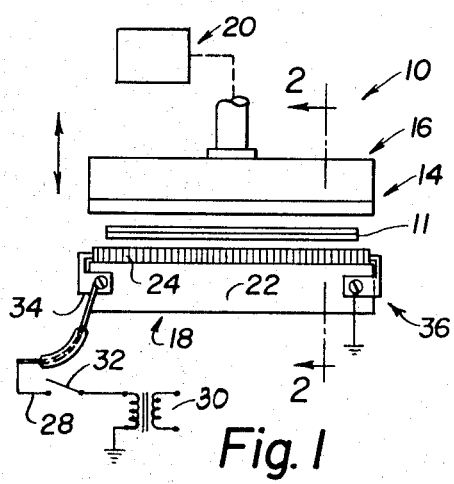
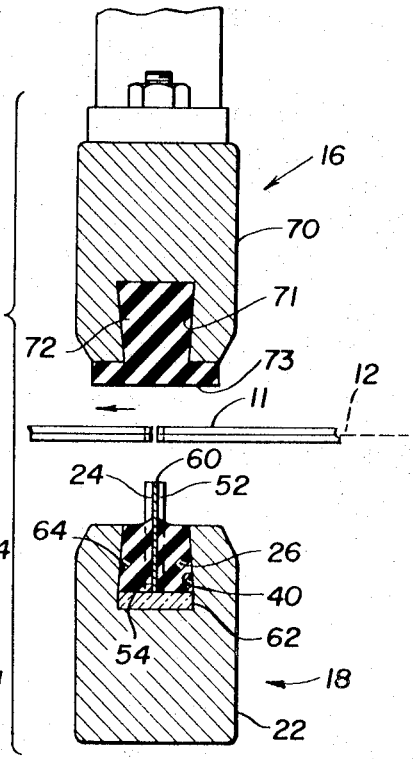
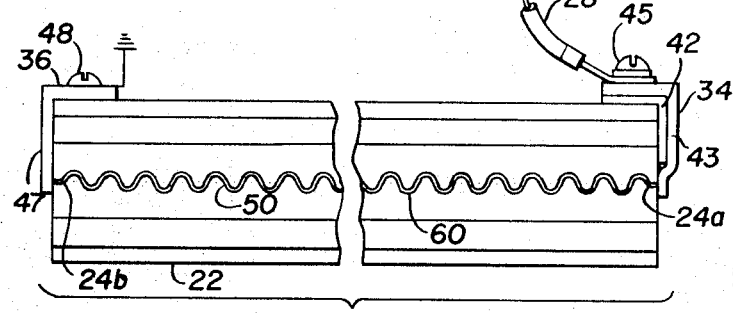
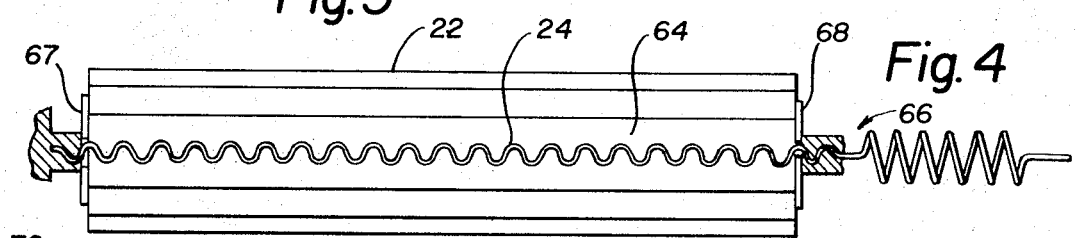
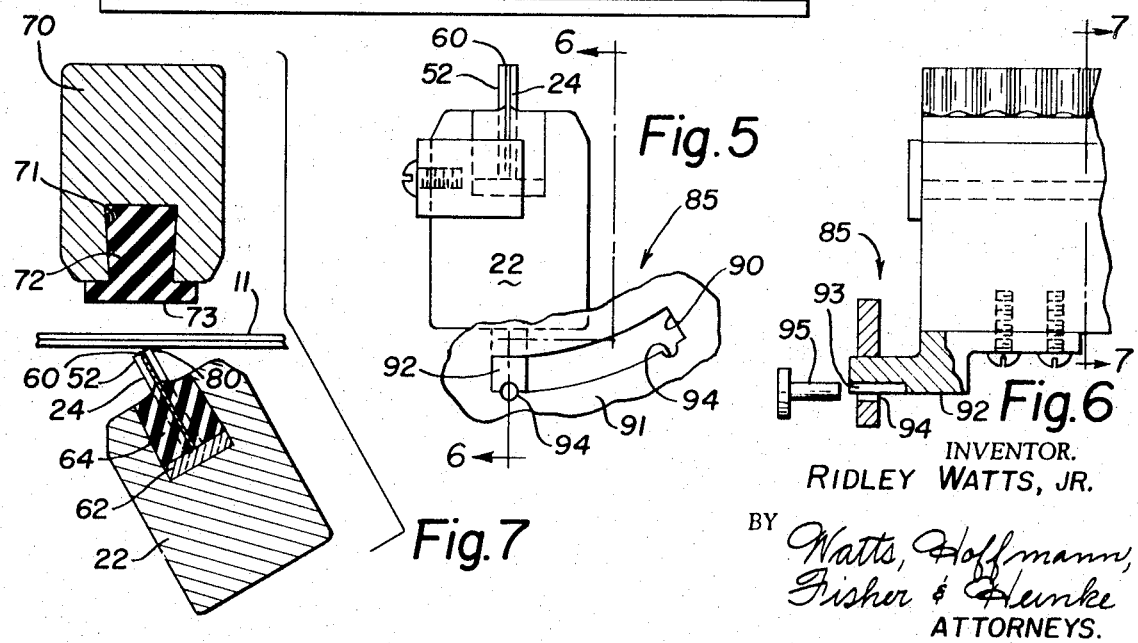
INVENTOR.
RIDLEY WATTS, JR.

3,614,383

1

IMPULSE HEATING DEVICE FOR USE WITH THERMOPLASTIC MATERIALS AND METHOD

BACKGROUND OF THE INVENTION

1. Field of the Invention

The present invention relates to apparatus for heating thermoplastic material and more particularly relates to a film cutoff or trim-seal apparatus employing a resistance-heated ribbon element.

2. The Prior Art

Devices employing resistance-heated elements have been constructed in the past for use in cutting thermoplastic film and cutting off and sealing thermoplastic bags or packages. While these prior art devices have been widely used, problems have arisen in connection with their use which have not been adequately dealt with.

In general, these prior art devices include a heater element formed by a wire or by a ribbon having a relatively high electrical resistance. The resistance element was energized from an electrical power supply for a short period when it was desired to cut or trim the film. The brief pulse of electrical energy passing through the wire or ribbon heated it to a temperature well above the melting temperature of the film for a brief interval and the film was engaged by the heated element for cutting, sealing, or both.

The resistance ribbons and wires were subject to thermal expansion and contraction during each cycle of their operation. Accordingly, during each cycle the elements expanded lengthwise when heated and then contracted during cooling. In order to maintain the elements in position to engage the film when heated, the prior art devices employed tensioning devices which maintained the elements under tension at all times. The tensioning devices were intended to take up slack developed in the elements when they expanded thermally.

The use of these tensioning devices resulted in the resistance elements stretching. Hence, the elements tended to become slack because of thermal expansion and due to operation of the very devices intended to prevent slackening of the elements. Stretching of the elements was primarily due to continuous tension in the elements at high temperature causing creep or nonelastic stretching of the element. When spring-tensioning devices were employed, the springs were also subject to nonelastic stretching which further contributed to the tendency of the elements to become slack.

Stretching of the elements, and elongation of springs, where employed, required that the tensioning devices be constantly adjusted. Accordingly, tension-adjusting mechanisms were provided for reinstating proper tension in the elements after stretching occurred. The inclusion of tensioning and tension adjustment devices have resulted in: (1) a substantial proportion of the cost of film heating devices being attributable to the tensioning and tension-adjusting devices; (2) film-heating devices which were of relatively large size due to inclusion of the tensioning and adjustment devices; (3) heating elements which were required to be sufficiently heavy to provide structural strength for resisting stretching by the tensioning devices; and (4) constant attention to the adjustment mechanisms by operators of the film-heating equipment.

Resistance-heated ribbon elements were used for rapid heating since the geometry of ribbons provides large surface areas for a heating element having a given mass. It was proposed to construct these elements from a straight ribbon of resistance material oriented so that an edge of a ribbon engaged the plastic film to cut and/or seal the film. The film-heating apparatus employing such ribbons included tensioning and tension adjustment devices of the character referred to. Hence, the ribbons were required to be of sufficiently large mass and strength to resist stretching.

Ribbon heating elements were also subject to bending or rolling over in response to film being pulled from the elements. When a film-heating element is heated and engaged with the film, circumstances are frequently such that the ribbon element cools to a temperature below the melting temperature of the film while remaining in contact with the film. In such circumstances, the film frequently "welds" to the heating element. The film must then be pulled from the element to mechanically break the adhesion between the plastic and the ribbon element.

The plastic film was generally pulled from the element in a direction transverse to the straight edge of the ribbon. The forces thus applied to the ribbon tended to roll the element over along its longitudinal axis. This was primarily due to the separating force applied to the ribbon being distributed across the ribbon between its ends and transversely to the extent of the ribbon. The application of such separating forces caused additional stretching of the ribbon elements. In many circumstances, the combination of stretching due to tensioning devices and due to pulling the film from the element required the use of ribbons which were of relatively large cross-sectional areas in order to provide requisite structural strength to resist the various sources of stretching forces applied to the ribbon.

SUMMARY OF THE INVENTION

The present invention provides a new and improved film cutoff or trim-seal apparatus which is: (1) simple in construction; (2) inexpensively manufactured; (3) devoid of tensioning and tension-adjusting devices; and (4) of relatively small size. This new apparatus employs a ribbon-type resistance heating element which: (1) exhibits virtually not change in overall length due to thermal expansion and contraction; (2) is structurally strong to resist distortion during normal use; (3) has a relatively small thickness as compared to the prior art resistance elements; (4) is configured to maximize the heating rates and electrical resistance for any given applied voltage; (5) enables the use of relatively low voltage electrical power supplies; and (6) is constructed to facilitate removal of film welded to the element with minimum stresses applied to the element.

In a preferred form, the apparatus according to this invention includes parallel jaws which are separated to define a space in which a plastic film, or films, may be disposed. One of the jaws is movable toward and away from the other so that the plastic film in the space is engaged between the jaws for cutting and/or sealing. One of these jaws is a film-heating jaw defined by an assembly including a thin corrugated ribbon-type resistance-heated element. An edge of this corrugated ribbon projects from the jaw. The other jaw forms a pressure pad and when the jaws are moved into engagement with the film, the projecting edge of the ribbon element compressively engages the film.

The film-heating jaw assembly further includes a body of dielectric material and a support bar. The support bar is constructed of a material having a relatively high heat conductivity and the dielectric material is provided between the resistance element and the support bar so that the element is electrically insulated from the bar, yet the bar provides a heat sink for cooling the element.

The resistance element is corrugated so that individual ridges or crests of the corrugations extend transverse to the longitudinal extent of the ribbon. These corrugations are preferably formed continuously along the ribbon. Thus the projecting edge of the ribbon engages the film along a narrow, nonlinear surface. In the preferred embodiment the engagement between the film and the element is defined by a sinusoidal or undulating line of contact.

The length of the corrugated ribbon does not change during heating and cooling. Thermal expansion of the new element is manifested by the corrugations becoming more pronounced, or deepening. Because the thermal expansion is, in effect, absorbed by the corrugations in the element, there is virtually no overall change in length of the element in response to heating. The dielectric material between the element and the support bar is deflected by the corrugations during heating and cooling. Thus the dielectric maintains the element properly positioned but does not interfere with expansion or contraction of the corrugations of the element.

Because the corrugated ribbon does not change in overall length when heated the dielectric material alone is sufficient to maintain the element properly positioned for cutting or sealing film. Accordingly tensioning and tension-adjusting devices need not be associated with the film-heating jaw. Hence, apparatus constructed in accordance with the present invention is utilized in a smaller space then an equivalent prior art device. Furthermore, due to the elimination of the tensioning and tension-adjusting devices, apparatus according to this invention is relatively inexpensively manufactured. Additionally, operators of this new apparatus need not concern themselves with constant attention to and adjustment of the resistance-heated element or its supports.

Due to the direction of the corrugations in the ribbon being transverse to the length of the element, the structuring of the corrugated element strongly resists rolling over, or bending, along its longitudinal extent. Hence, the new ribbon element strongly resists bending when film is pulled from it. Since the structuring of the element is principally responsible for its strength the thickness of the ribbon material itself can be relatively small as compared to that of the prior art ribbons. Additionally, since the corrugated ribbon it not tensioned during use, the longitudinal tensile strength of the ribbon need not be great. The necessity of requisite ribbon thickness to provide tensile strength is thus eliminated. In short, the new ribbon element can be made substantially thinner than the prior art ribbon elements.

The new ribbon maximizes electrical resistance for a given heating jaw length. The corrugate construction of the new ribbon provides a longer path for electrical current flow than through a straight ribbon of the same overall length. As previously noted, the new ribbon has a smaller thickness, and therefore a smaller current flow area, than the prior art ribbons. The long current flow path and the small cross-sectional area of the new corrugated ribbon result in a heating element having a substantially greater electrical resistance than was possible with a prior art element of equivalent length.

Because of the improved electrical resistance characteristics of the new ribbon element, relatively low voltage electrical power supplies may be used in connection with a trim-sealing device constructed in accordance with the invention. Reduction of the power supply voltages reduces the possible safety hazard to operators of the apparatus. Furthermore, because of the minimum mass and maximum surface area of this corrugated ribbon, the thermal rise or heating rate of the new ribbon is maximized for any given applied voltage.

Film which is adhered to the new element is easily pulled off and does not exert significant forces on the element. Pulling film welded to the ribbon results in disengagement of the film from the ribbon along shear angles. That is to say, the forces applied to the ribbon by the film in the pulling direction are not uniformly normal to the sides of the ribbon over its length. When plastic film is pulled from the new element in a direction transverse to its extent, the only locations at which forces applied to the element are normal to the sides of the ribbon are at the crests of the corrugations. At all other locations, these separating forces are at a shearing angle to the sides of the ribbons. This results in what may be termed "shearing" the film from the element. The shearing effect has been observed to reduce the total force required to pull a given film from the new element below that required to remove the same film from a prior art ribbon element having the same overall length.

The new ribbon element also performs the function of perforating or perforating and sealing. The corrugated ribbon can be positioned to engage the film only at alternate crests of the corrugations. When a single ply of the film is engaged by the heated element, a series of perforations is formed across the film.

When two plies of the film are engaged by the element, oriented as described, the plies are both perforated and sealed together adjacent the perforations. Plastic bags can be produced in this manner which are closed and easily separable from a chain or web of the bags. Closing the bags and providing a "tear line" between bags is thus accomplished by a single operation using the new film-heating apparatus.

Simultaneous closing and perforating occurs as a result of the crests of the corrugations cutting the plies at spaced locations. The film adjacent the crests is heated sufficiently to seal the plies together at least adjacent the perforations. In some circumstances the bags are hermetically sealed and perforated simultaneously. This is accomplished by orienting the ribbon element so that its edge nearly engages the film across the full length of the ribbon. The conductive heat transfer to the plies of the film welds the plies together across the length of the element.

In one embodiment of the invention the support bar for the heater element is movably supported so that the heating element can be adjusted for cutting and/or sealing or to perforate and/or seal the film. The support mechanism for the bar is adjustable to enable manipulation of the bar to position the element as desired.

It should be noted that although the film-heating apparatus forming the preferred embodiments of the invention is heated by electrical impulses, this apparatus can be continuously heated if desired.

In a preferred embodiment of the invention, the resistance element is located in a longitudinal groove in the support bar and the dielectric material includes suitable potting compound, such as silicon rubber, which partially surrounds the ribbon and fills the major portion of the groove. This potting compound resiliently supports the ribbon in the bar. Because of flexible nature of the silicon rubber, the corrugations of the ribbon expand and contract relatively freely during heating cycles.

The new element can also be supported by ceramic insulator members disposed in a groove in the support bar. The ceramic members are cast about the element. Because of the difference in thermal expansion and contraction of the ceramic and the material forming the heating element, the ceramic members crack when the element is heated. Thereafter, the cracked ceramic members are deflected away from the element when it heats. The ceramic members are maintained in position in the groove and in turn maintain the ribbon element properly positioned even though they are cracked.

The preferred dielectric body also includes an insulator pad at the base of the groove in the support bar which positions the resistance element in the groove before and during the potting operation. This pad assures that the element does not make electrical contact with the base of the groove while enabling heat transfer to the bar from the element.

It has been found that the corrugated ribbon is difficult to properly position in the groove. It is believed that formation of the corrugations in the ribbon causes the ribbon to resist assuming a straight line when placed unrestrained in the groove.

It is important that the element extend generally parallel to the sides of the groove and be consistently spaced from the sides for two reasons: (1) if the ribbon is too close to a side of the groove, electrical conduction can occur between the element and the support bar through the dielectric; and (2) if the element is too far from the side of the groove, the dielectric material will be heated unduly by the element resulting the damage to the dielectric material.

To insure proper positioning during potting the element is tensioned sufficiently to straighten it in the groove. This tension force is insufficient to straighten the corrugations. The tension force is released when the surrounding dielectric material is hardened and the element is thereafter supported in a generally straight line with the crests of the corrugations lying along lines parallel to the sides of the groove.

A principal object of the present invention is the provision of a new and improved film-heating apparatus which is compact, versatile, inexpensively manufactured, devoid of tensioning devices and tension-adjusting mechanisms, and highly reliable in operation.

BRIEF DESCRIPTION OF THE DRAWINGS

FIG. 1 illustrates apparatus for heating thermoplastic material which is constructed according to the invention;

FIG. 2 is a cross-sectional view seen from the plane indicated by the line 2—2 of FIG. 1;

FIG. 3 is a pan view of a part of the apparatus of FIG. 1 with portions broken away;

FIG. 4 is a view similar to FIG. 3 showing a stage in the manufacture of apparatus constructed according to the invention;

FIG. 5 is an elevational view of a modified apparatus embodying the invention with portions broken away;

FIG. 6 is a view seen from the plane indicated by the line 6—6 of FIG. 5; and,

FIG. 7 is a cross sectional view of the apparatus of FIG. 5 is one operative position seen from the plane generally indicated by the line 7—7 of FIG. 6.

DESCRIPTION OF PREFERRED EMBODIMENTS

An apparatus 10 for cutting and/or sealing thermoplastic film material 11 is illustrated in FIG. 1.

The apparatus 10 defines a cutting station, or space, 14 is which the film 11 is positioned to be cut and/or sealed. Two plies of the film 11 are illustrated. The cutting station 14 is defined by first and second jaws 16, 18, which are disposed on opposite sides of the space 14. A suitable mechanism 20 moves the jaw 16 toward and away from the jaw 18 so that the film 11 is engaged between the jaws. The jaw 18 locally heats the film above its melting temperature for trimming and/or sealing the film engaged between the jaws. The jaw 16 provides a pressure surface enabling pressure engagement of the film with the heating jaw.

When the plies of film are engaged by the heating jaw the plies are cut through and are sealed together adjacent the part line. In this manner individual baglike containers are trimmed and sealed. If a single ply of film is engaged by the jaws the film is cut.

The heating jaw 18 includes a support bar 22, a heating element 24, and a dielectric body 26 for supporting the element 24 on the bar 22.

The element 24 is resistance heated and circuitry is provided for applying a voltage across the element to heat it. A conductor 28 connects the element 24 to a power supply terminal 30 through a control switch 32 and electrical connector assembly 34. The circuit is completed through the element 24 and to ground through a connector assembly 36. The power supply provides sufficient electrical power to quickly heat the element 24 well above the melting temperature of common plastic films when the switch 32 is momentarily closed.

Momentary closing of the switch 32 permits the element 24 to function as a "pulse" heater, i.e. it is briefly heated when cutting and/or trimming is to be performed and is at other times unheated. The element 24 can be continuously heated, if desired, by merely maintaining the switch 32 closed.

The bar 22 is preferably an aluminum extrusion having a longitudinally extending dovetail groove 40 formed in one side. The dielectric body 26 and the element 24 are supported in this groove.

The bar 22 carries the connector assemblies 34, 36 (see FIG. 3) which are fixed to its ends. The assembly 34 includes an insulator 42 and a conductor strap 43. The conductor strap is suitably connected to one end 24a of the element and the insulator 42 insures against electrical contact between the strap and body. The insulator and strap are attached to the body by a screw 45 which is electrically insulated from the bar. The screw 45 urges the conductor 38 into engagement with the strap.

The connector assembly 36 includes a conductive strap 47 connected to the opposite end 24b of the element. The strap 47 is connected to the body by a screw 48, and as shown, is electrically grounded through the screw 48 and body 22.

The resistance element 24 is an extremely thin ribbon of material having a relatively high electrical resistivity. Preferably the element 24 is composed of a nickel-chromium alloy and has a thickness of approximately two thousandths of an inch and width of about a quarter of an inch. A series of corrugations 50 are formed along the length of the element at closely spaced intervals. The corrugations extend transversely of the side edges 52, 54 of the element and in the preferred construction these corrugations extend at right angles to the edges.

As is best seen in FIG. 2, the edge 52 projects from the groove 40 toward the jaw 16. The other edge 54 is seated in the groove 40. As seen in FIG. 3, the edge 52 defines a narrow planar surface 60 which defines an undulating or sinusoidal line in the plane of the surface. whether element 24 is heated, and the jaws 16, 18 compress the film between them, the surface 60 compressively engages the film. Due to the high temperature of the element 24 the plastic material engaged by the surface 60 becomes molten and is thus cut by the element. The material adjacent the surface 60 is heated sufficiently by conduction to fuse the plies together on both sides of the cut line.

Structuring of the element 24 by the corrugations 50 enables the element to be heated with virtually no change in length between its ends 24a, 24b. When the ribbon material expands on heating the corrugations 50 become more pronounced, or deepen. This change in shape of the corrugations occurs without any overall change in length of the element. A accordingly, the element 24 need not be tensioned during use.

Structuring the ribbon also provides rigidity of the ribbon which resists distortion of the ribbon when film is pulled off the element. Because the corrugations rigidify the ribbon, ribbons used to construct the new element may be thinner than prior art ribbons since ribbon thickness need not provide requisite structural strength to resist such bending. Further, since the ribbon is not tensioned, the thickness of the ribbon need not be such as to provide tensile strength to resist stretching.

The corrugated ribbon element provides a large electrical resistance for a given end to end length of the element. This is a result of the corrugations producing: (1) a relatively long conductive path between the ends of the element; and (2) structural strength enabling the cross-sectional area (i.e. thickness) of the ribbon to be small. These factors maximize the electrical resistance of the element and permit operation of the new element with relatively low voltage power supplies if desired.

The new ribbon construction maximizes the heat rise of the element. The thinness of this element minimizes its mass while the surface area of the ribbon is large. Thus, the surfaces of the ribbon are quickly heated when voltage is applied across it.

Because the corrugations 50 run transversely to the edge 52, the nonlinear shape of the line of contact between the element 24 and the film permits the film to be easily pulled from the element. When welding occurs between the film and the surface 60, pulling the film from element does extend simultaneous right angle forces to the top edge 52. Parting occurs along shear angles. These shear angles are defined between the direction of the pulling force on the film and the plane of the side of the ribbon at the point of application of the force. Forces transverse to the ribbon are only exerted at the creases of the corrugations.

It has been found that the force required to pull a sheet of plastic from the element 24 is substantially less then is required to pull a sheet of plastic from a straight ribbon of the same material having the same end to end length ad the ribbon 24.

The dielectric support 26 for the element 24 includes a generally rectangular pad of electrical insulating material 62 and a body 64 of a suitable plastic, such as silicon rubber. The pad 62 extends along the base of the groove and supports the edge 54 of the element 24 to insure against the element 24 making electrical contact with the bar 22 at the base of the groove. During manufacture of the bar 22, the pad 62 is placed in the groove 40 and the element 24 is then supported in the groove as shown in FIG. 4 with the edge 54 resting on the pad 62. The pad can be constructed from a resilient material if desired.

The body 64 is formed by flowing an uncured silicon rubber compound about the element 24 to fill the groove 40 and then curing or hardening the compound. THe dovetail construction of the groove 40 insures that the cured compound is retained in the groove and the compound adheres to the element 24. Thus, the element 24 is firmly maintained in place in the groove.

The body 64 is preferably slightly resilient to enable limited relative movement of the element 24 is the groove 40. Because of thermal expansion and contraction of the corrugations, the body 64 is deflected slightly when the element expands. The expansion of the corrugations is directed outward at each change of direction of the corrugations. This compresses the body 64 instead of being reflected by lengthwise growth of the element. The body 64 also resiliently supports the element 24 for minute deflection away from the vertical position illustrated in FIG. 2 in response to forces applied to the element 24 as plastic is pulled from the surface 60.

Accurate positioning of the element 24 in the groove 40 is important in the production of this apparatus. The bar 22 forms a heat sink for the element 24 and accordingly, as the element 24 cools, heat flows from the element 24 through the body 64 and pad 62 and to the bar 22. The body 64 and pad 62 are essentially electrical insulators and are not efficient heat conductors. Thus, these bodies must provide a relatively short path for the heat flow from the element 24 to the bar 22 to avoid building up residual heat which could destroy them. On the other hand, the body 64 and pad 62 must space the element 24 sufficiently from the sides and base of the groove to prevent an electrical short circuit with the bar 22.

It has been found that the corrugated ribbon forming the element 24 resists assuming a generally straight line when relaxed. Hence, if the element is placed in the groove 40 in a relaxed condition, the element will tend to curl or warp and make contact with the sides of the groove. This is apparently due to the internal stresses generated during corrugating the ribbon.

As previously pointed out, the element 24 must be accurately positioned in the groove 40. For this reason, it has been found that the element 24 should be tensioned during the potting process. FIG. 4 shows a stage in the potting process with the ribbon in tension.

As shown in FIG. 4, one end of the element 24 is fixed to a rigid support while the other end is connected to a suitable spring-tensioning device 66 which applies a tensioning force to the element 24. This force is sufficient to straighten the element so that the crests of the corrugations extend along lines parallel to the sides of the groove 40. The tensioning force is not sufficient to straighten the corrugation. Slotted dam members 67, 68 may be fitted onto the element at the ends of the groove 40 to prevent the potting compound from flowing out of the groove.

The tensioning device 66 and dams 67, 68 are removed when the body 64 is cured. The connector assemblies 34, 36 are then assembled to the element 24 and bar 22.

The jaw 16 includes a support bar 70 formed from an aluminum extrusion which is, in the preferred embodiment, identical to the bar 22. Accordingly, the bar 70 includes a dovetail groove 71. A rubberlike dielectric member 72 is disposed in the groove 71 to provide a pressure pad having a surface 73 which is opposed to the edge 52 of the element 24.

The member 72 is preferably a silicon rubber composition like that forming the body 64 and is potted in the groove 71. The surface 73 therefore is slightly resilient and resiliently urges the plastic film 11 into engagement with the element 24 as the jaws engage the film. The bar 70 may be connected to the actuating mechanism 20 in any suitable manner, for example, by machine screws 74 illustrated in FIGS. 1 and 2.

By changing the orientation of either of the bars 22, 70, the plastic film can be engaged between the surface 73 and the element 24 to provide a perforated tear line in the film. When two film plies are used the plies are sealed on each side of the perforations.

FIG. 7 shows the bar 22 rotated about an axis extending along the surface 60 for this purpose. As is seen in FIG. 7, only the crests 80 of the corrugations 50 engage the film 11 when the jaws close on the film. The heated crests 80 cut through the film 11 thereby forming a series of spaced perforations in the film. Where a dual ply web of film is used heat conduction from the element fuses the plies of film together at least adjacent the perforations so that the plies are sealed and perforated. This enables production of chairs of closed, tearoff bags. When the surface 60 is disposed in a plane which makes only a slight angle with respect to the film, the crests of alternate corrugations perforate the plies while the remaining portions of the surface 60 heat the plies sufficiently to fuse them together between the perforations. Baglike containers thus produced are hermetically sealed and easily separated.

During the potting process, the element 24 may, within limits, extend from the groove 40 at a slight angle. This is to say the element may become slightly misaligned with the groove in such a way that the element is not exactly normal to the base of the groove when viewed in cross section. Hence, in addition to providing an adjustment for perforation film, the mounting construction 85 can be used to adjust the plane of the surface 60 to extend parallel to the film to insure cutting.

Although two embodiments of the invention have been illustrated and described in considerable detail, it should be apparent from the foregoing that numerous adaptations, modifications and uses of the present invention may occur to those skilled in this art and it is the intention to cover hereby all such adaptations, modifications and uses of the invention.

What is claimed is:
1. An assembly for cutting plastic film by localized heating of the film above the melting temperature comprising:
   a. a film heater element comprising a thin ribbon of electrical resistance-heating material having opposite major surfaces and generally parallel first and second sides;
   b. circuit means for connecting said heater element in an electrical circuit to elevate the temperature of said element above the melting temperature of plastic film; and,
   c. support means for said element comprising:
      1. an elongated heater element support body oriented to extend across a width of plastic film, said heater element coextending with said body; and,
      2. dielectric support means between said support body and said heater element, said dielectric support means comprising support portions extending between the ends of said heater element along said major surfaces and a first side of said heater element;
   d. said heater element ribbon having transverse closely spaced corrugations formed substantially continuously between the ends thereof and said second side of said heater element projecting slightly from said dielectric support means;
   e. said second side of said heater element lying in a plane and defining an approximately sinusoidal narrow line in said plane, said heater element engageable with a plastic film along at least parts of said line to cut said film;
   f. heating of said heater element causing said corrugations to deepen due to thermal expansion without increasing the overall length of said heater element and said heater element being laterally supported by said dielectric means at least when heated.

2. The assembly claimed in claim 1 wherein said support body is composed of material having a relatively large heat conductivity for transferring heat from said heater element and said dielectric support means.

3. An assembly as claimed as in claim 2 wherein said dielectric support means is deflectible to enable movement of said heater element corrugations relative to said support body in response to thermal expansion and contraction of the material forming said heater element.

4. An assembly as claimed in claim 1 wherein said heater element is comprised of a nickel-chromium alloy and has a thickness which is extremely small in relation to its width.

5. In an apparatus for heating plastic film:
   a. a first support member constructed from a material having a relatively high heat conductivity;
   b. a heater element comprising a thin ribbon of resistance-heating material supported by said member with a side surface portion of said element projecting away from said member, said heater element extending linearly throughout its length along said support member;
   c. at least one body of dielectric material between said element and said member, said at least one body in heat exchange relationship with said element and said member and extending along faces of said heater element for maintaining said one surface portion of said element in position;
   d. said element defining corrugations having crests extending transversely to said one surface portion;
   e. a second support member defining a pressure surface spaced from said one surface portion of said element; and,
   f. means for effecting relative movement between said first and said second support members whereby at least a part of said one surface portion engages film between said element and said opposed pressure surface along at least one nonlinear, narrow line of engagement.

6. Apparatus as claimed in claim 5 wherein said line of engagement is approximately sinusoidal whereby film adhered to said surface portion is separated therefrom by a shearing action when the film is pulled.

7. Apparatus as claimed in claim 5 and further including structure for rotating one of said first and second bodies to establish contact between said heater element and film at a plurality of spaced locations defined by crests of said corrugations.

8. In an apparatus for heating thermoplastic material:
   a. first and second jaws spaced apart to define a space therebetween in which at least one sheet of plastic material is insertable;
   b. mechanism supporting one of said jaws for movement toward and away from said other jaw whereby plastic material in said space is engaged between said jaws;
   c. one of said jaws including:
      1. an elongated support member comprised of a material having a relatively high heat conductivity, said support member extending across said space and having a groove therein extending along said member;
      2. a heating element defined by a transversely corrugated ribbon having a relatively large electrical resistance, said heating element partially disposed in said groove and extending along said groove in a path substantially parallel to sides of said groove;
      3. at least one dielectric body in said groove between said heating element and said support member, said at least one body extending along opposed faces of said heating element for laterally supporting said heating element;
      4. said element projecting from said support member toward said other jaw to define a substantially planar nonlinear plastic heating surface portion.

9. Apparatus as claimed in claim 8 wherein one of said jaws is supported by mounting means for adjustably positioning the angle of the plane of said heating surface relative to the other jaw.

10. Apparatus as claimed in claim 9 wherein the other of said jaws includes a resiliently deflectible pressure pad engageable with the plastic material to urge the plastic material against said heating surface.

11. Apparatus as claimed in claim 9 wherein said mounting means includes relatively movable parts for adjustably positioning the plane of said heating surface to intersect said plastic material whereby said element heats the plastic adjacent crests of said corrugations to produce spaced perforations in the plastic material.

12. Apparatus as claimed in claim 11 wherein said plastic material is defined by two plies of plastic film, said heating element engaging said film to form said perforations and for heating said film at least adjacent said perforations to seal said plies together on opposite sides of said perforations.

13. An electrical heater assembly for cutting plastic sheets or film by heating the plastic material above its melting temperature along at least one narrow line of contact comprising:
   a. an elongated support body positioned to extend across a plastic sheet or film and having ends projecting beyond opposite sides of a sheet or film;
   b. a thin ribbon of electrical resistance heating material extending along said support body, said ribbon having ends adjacent respective ends of said support body and defining opposed faces having substantially parallel first and second sides and oriented with respect to said body member so that said first side projects from said body toward a plastic sheet or film for engagement therewith along the line of contact;
   c. means defining an electrical circuit connected to said ribbon for establishing electrical current flow through said ribbon to heat the ribbon to a temperature substantially above the melting temperature of a plastic film or sheet;
   d. dielectric support means between said support body and said ribbon, said dielectric support means comprising support portions extending substantially along the lengths of said ribbon faces and from said second side along said faces toward said first side so that said ribbon is laterally supported by said portions;
   e. said ribbon further defining closely spaced corrugations extending transversely to said first and second sides for stiffening said ribbon, said corrugations formed substantially continuously throughout the length of said ribbon whereby said first side of said ribbon is approximately sinusoidal; and,
   f. said first side of said ribbon projecting from said dielectric support means for contact with a plastic sheet or film.

14. An assembly as claimed in claim 13 further including connectors at opposite ends of said ribbon for nonresiliently anchoring said ribbon ends to said support body.

PO-1050
(5/69)

UNITED STATES PATENT OFFICE
CERTIFICATE OF CORRECTION

Patent No. 3,614,383                Dated  October 19, 1971

Inventor(s) IMPULSE HEATING DEVICE FOR USE WITH THERMOPLASTIC MATERIALS AND METHOD It is certified that error appears in the above-identified patent and that said Letters Patent are hereby corrected as shown below:

Column 2, line 28 "not" should be --no--.

Column 3, line 32 "corrugate" should be --corrugated--.

Column 5, line 14 "pan" should be --plan--;

line 24 "is" should be --in--.

Column 6, line 1 "38" to --28--;

line 21 "whether" to --When the--;

line 36, delete "A" and change "accordingly" to --Accordingly--;

line 71 "creases" should be --crests--.

Column 7, line 1 "ad" should be --as--;

line 22 "is" should be --in--.

Column 8, line 34 "perforation" should be --perforating--.

Signed and sealed this 16th day of May 1972.

(SEAL)
Attest:

EDWARD M. FLETCHER, JR.
Attesting Officer

ROBERT GOTTSCHALK
Commissioner of Patents